United States Patent Office 2,763,640
Patented Sept. 18, 1956

2,763,640

CUPRIFEROUS AZO-DYESTUFFS

Henri Riat, Arlesheim, and Paul Dreyfuss and Fritz Oesterlein, Basel, Switzerland, assignors to Ciba Limited, Basel, Switzerland, a Swiss firm No Drawing. Application December 21, 1953,
Serial No. 399,584

Claims priority, application Switzerland
December 24, 1952

3 Claims. (Cl. 260—148)

This invention provides new direct dyeing azo-dyestuffs and cupriferous azo-dyestuffs, for example, the dyestuff of the constitution (1)
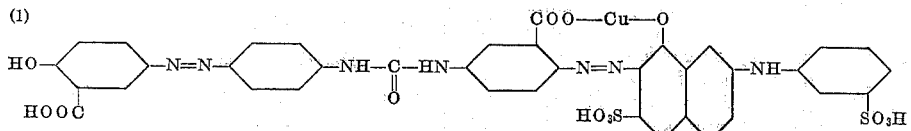
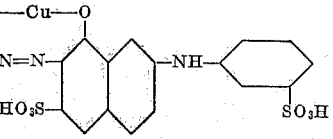

The new dyestuffs contain more than one azo linkage and an ortho-hydroxy-ortho'-carboxy-azo-grouping, which is capable of forming metal complexes or is metallized. The dyestuffs which contain a grouping capable of forming metal complexes correspond to the general formula (2)
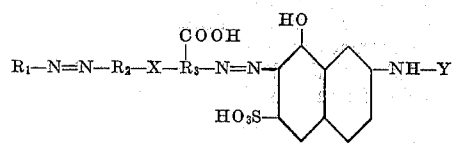

in which $R_1$, $R_3$ and Y represent benzene radicals, the radical $R_1$ containing in para-position with respect to the azo linkage a hydroxyl group and in ortho-position to the latter group a carboxylic acid group, the radical $R_3$ being bound in the 1:2:4-positions respectively to the azo linkage, the carboxylic acid group and X, $R_2$ representing a benzene or napthalene radical to which the azo linkage and the bridge member X are bound in para-position, and X represents an —HN—CO—NH— bridge or a triazine radical bound by their —NH—groups to $R_2$ and $R_3$.

The cupriferous dyestuffs correspond to the formula (3)
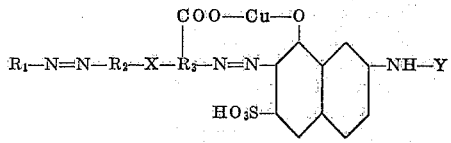

in which $R_1$, $R_2$, $R_3$, X and Y have the meanings given above, and in which the radical $R_1$ may also contain copper bound in complex union.

The invention also includes a process for making the new dyestuffs in which two aminoazo-dyestuffs of the formulae (4)  $R_1$—N=N—$R_2$—NH$_2$ and (5)
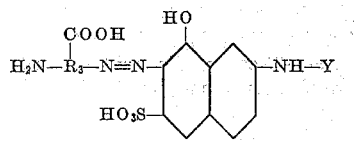

in which $R_1$, $R_3$ and Y represent benzene radicals, the radical $R_1$ containing in para-position with respect to the azo linkage a hydroxyl group and in ortho-position to the latter group a carboxylic acid group and the radical $R_3$ being bound in the 1:2:4-position respectively to the azo linkage, carboxylic acid group and amino group $R_2$ representing a benzene or napthalene radical to which the azo linkage and the amino group are bound in para-position, are linked together at their amino groups to form the corresponding urea or triazine derivative, and if desired, the dyestuff so obtained or the initial dyestuff of the Formula 5 is treated with an agent yielding copper.

The linking together of the two aminoazo-dyestuffs to form the urea derivative may, for example, be carried out in the usual manner with phosgene, advantageously by introducing phosgene into an aqueous alkaline solution which contains the two dyestuffs. In this manner there are generally obtained, in addition to the asymmetrical urea derivatives which are formed predominantly, a small amount of symmetrical urea derivatives which do not usually have any disadvantageous effect. A practically unitary asymmetrical urea derivative is obtained when, instead of reacting the two aminoazo-dyestuffs with phosgene, one of the dyestuffs is converted, advantageously the dyestuff of the Formula 4, for example, by means of chloroformic acid phenyl ester, into the phenyl-urethane, and the latter is condensed with the other aminoazo-dyestuff.

The linking together of the two-aminoazo-dyestuffs to form the triazine derivative is advantageously carried out in stages by means of a cyanuric halide, more especially cyanuric chloride. The condensations with the cyanuric halide may be carried out in any desired order of succession, for example first with the dyestuff of the Formula 5 and then with the dyestuff of the Formula 4. In some cases it is of advantage to add to the aqueous reaction medium a substantial amount of an inert, water-soluble organic solvent such, for example, as acetone. This procedure leads to especially valuable results, for example, in making cupriferous azo dyestuffs of the Formula 3 with the use of a cupriferous amino azo dyestuff of the Formula 5. The third halogen atom remaining attached to the triazine ring may, if desired, be exchanged for a hydroxyl group, or further reactions may be carried out at that atom, for example, it may be reacted with ammonia or an aromatic amine such as aminobenzene.

Aminoazo-dyestuffs of the Formula 5 are obtained by coupling a diazotized aminobenzene, which contains in ortho-position to the amino group a carboxylic acid group and in para-position to the amino group a substituent convertible into an —NH$_2$ group, with a 2-phenylamino-8-hydroxynaphthalene-6-sulfonic acid, and then converting the aforesaid substituent into an —NH$_2$ group. As diazo-component there comes into consideration more especially 4-nitro-1-aminobenzene-2-carboxylic acid. Instead of this nitro compound there may be used the corresponding acetylamino-compound, and in this case after the coupling, hydrolysis of the acetylamino group must be carried out instead of reduction of the nitro group.

The 2-phenylamino-8-hydroxynaphthalene - 6 - sulfonic acids required for making the aminomonoazo-dyestuffs of the Formula 5 may contain further substituents in the phenyl radical, for example, halogen atoms such as chlorine, or methyl or methoxy groups. In the case of the cupriferous dyestuffs made by the present process the presence of a group imparting solubility in the phenyl radical of the phenylamino group, for example, a sulfonic acid or carboxylic acid or sulfonic acid amide group is especially advantageous, and as examples of such coupling components there may be mentioned 2-phenylamino-8-hydroxynaphthalene-6:3'- or 6:4'-disulfonic acid and also 2-phenyl-amino-8-hydroxynaphthalene-6-sulfonic acid - 3'- or -4'-carboxylic acid.

The dyestuffs of the Formula 4 may contain in the radical $R_1$, advantageously in ortho-position with respect to the hydroxyl group, a further substituent, for example, a halogen atom, a methyl group or a sulfonic acid group. The radical $R_2$ may also contain further substituents such, for example, as a methyl or methoxy group, a halogen atom such as chlorine, or a sulfonic acid amide group. As examples of suitable aminoazo-dyestuffs of the Formula 4 there may be mentioned in this connection: 4-amino-4'-hydroxy - 1:1' - azobenzene-3'-carboxylic acid, 2-chloro-4-amino-4'-hydroxy-1:1'- azobenzene-3'- carboxylic acid, 2-methyl-4-amino-5-methoxy-4'-hydroxy-1:1' - azobenzene-3'-carboxylic acid, 4-amino-4'-hydroxy - 1:1'-azobenzene-3'-carboxylic acid-5'-sulfonic acid, 2-methyl-4-amino-5-methoxy-4'- hydroxy - 1:1'-azobenzene-3'-carboxylic acid-5'-sulfonic acid, and 4-amino-4'-hydroxybenzene-1'-azo-1-naphthalene-3'-carboxylic acid-6- or -7-sulfonic acid.

The dyestuffs of the Formula 2 are suitable for dyeing and printing a very wide variety of materials, especially cellulose-containing fibers. They can be treated with agents yielding metal, and the treatment may be carried out by the usual known methods. In the case of dyestuffs possessing sufficient solubility, and especially when the dyestuffs contain insufficient groups imparting solubility to be well suited for dyeing by the usual direct dyeing methods in the form of their complex metal compounds, the treatment with the agent yielding metal is advantageously carried out on the fiber or in a single bath in part in the dyebath and in part on the fiber. A further advantageous dyeing method in the case of those dyestuffs of the Formula 2 which yield sparingly soluble metal complexes, consists of using a dyebath prepared with the dyestuff, an hydroxy-alkylamine, a metallizing agent stable towards alkali, and advantageously a compound which contains the anion of a phosphoric acid. Methods of this kind are described in U. S. Patent applications Serial Nos. 319,773 and 319,774.

However, especially valuable results are obtained with the dyestuffs formed by treating a dyestuff of the Formula 2 with an agent yielding copper, or with the cupriferous azo dyestuffs of the Formula 3 obtainable from the coppered intermediate dyestuffs.

The treatment of the dyestuffs of the Formula 2 or the intermediate dyestuff of the Formula 5 with an agent yielding metal can be carried out by the customary methods. The metallization can be carried out, for example, with a salt of divalent copper in a weakly acid aqueous medium. The dyestuffs can also be metallized by methods in themselves known in which the metallization is carried out in an aqueous medium at a raised temperature with the use of copper tetrammine complexes in the present or absence of an excess of amine or ammonia.

As the dyestuffs of the Formula 2 contain in the radical $R_1$—N=N—$R_2$— an ortho - hydroxy - carboxylic acid group, this group may also be coppered. It may be desirable so to carry out the treatment with the agent yielding metal that the formation of a complex takes place also in the aforesaid group of the dyestuff. In general, however, it is advantageous when no metallization occurs at the ortho-hydroxy-carboxylic acid grouping.

With regard to the formulae of the cupriferous dyestuffs given herein, these formulae undoubtedly represent the correct stoichiometric proportions of copper and the correct position of the copper atom in the complex, but the distribution of the main and secondary valencies in the complex union of the metal has not yet been established with certainty.

The new cupriferous azo-dyestuffs corresponding to the general Formula 3 can be used for dyeing and printing a very wide variety of materials such as wool, silk, leather and especially cellulose-containing fibers such as cotton, linen and also artificial silk and staple fibers of regenerated cellulose, and if desired, in the case of those dyestuffs which contain an uncoppered orthohydroxycarboxylic acid group, they may be treated with an agent yielding metal on the fiber or in the dyebath.

In the case of those cupriferous dyestuffs of the Formula 3 which are too sparingly soluble for application by the usual direct dyeing processes, they are suitable for use in such processes when applied from neutral to alkaline dyebaths, which have been prepared from sparingly soluble complex copper compounds of direct dyeing dyestuffs, certain aliphatic amines which contain at least one amino group separated from a hydroxyl group by two carbon atoms (for example, 1:2-di-(β-hydroxyethylamino)-ethane), and phosphorus compounds derived from acids of phosphorus having the constitution $$H_{m+2}P_mO_{3m+1}$$

in which $m$ represents a whole number (see also the specification hereinbefore mentioned).

By means of the cupriferous dyestuffs of the Formula 3 and the dyestuffs of the Formula 2 when they are metallized on the fiber, there are obtained dyeings which are distinguished by their especially interesting tints and in general by their unexpectedly good properties of fastness, above all by their good fastness to light.

The following examples illustrate the invention, the parts and percentages being by weight unless otherwise stated and the relationship of parts by weight to parts by volume being the same as that of the kilogram to the liter:

*Example 1*

55.8 parts of the monoazo-dyestuff, obtained by coupling diazotized 5-acetylamino-2-aminobenzene-1-carboxylic acid with 2-phenylamino-8-hydroxynaphthalene-6:3'-disulfonic acid in an alkaline medium, followed by splitting off of the acetyl group by heating the product in sodium hydroxide solution of 4 per cent. strength, are dissolved together with 25.7 parts of 4-amino-4'-hydroxy-1:1'-azobenzene-3'-carboxylic acid with the addition of sodium carbonate in 2000 parts of water. Phosgene is introduced into the resulting solution at 35–40° C. until the free amino-compound can no longer be detected. By the addition of sodium carbonate the reaction mixture is continuously maintained weakly alkaline. As soon as the reaction is finished 10 parts of sodium chloride are added for every 100 parts by volume of reaction mixture, and then the dyestuff is filtered off.

The dyestuff paste so obtained is stirred with 2000 parts of water and sulfuric acid is added until the reaction is weakly acid to Congo. After the addition of 25 parts of crystalline copper sulfate the whole is treated for about one hour at 80–90° C. The dyestuff is then filtered off, washed with sodium chloride solution of 10 per cent. strength, converted into its sodium salt advantageously by means of sodium carbonate, and dried. It is a black-brown powder which dyes cotton brown tints which are fast to light.

By using, instead of 4-amino-4'-hydroxy-1:1' azobenzene-3'-carboxylic acid, 2-chloro-4-amino-4'-hydroxy-1:1'-azobenzene-3'-carboxylic acid a similar dyestuff is obtained, which corresponds to the formula

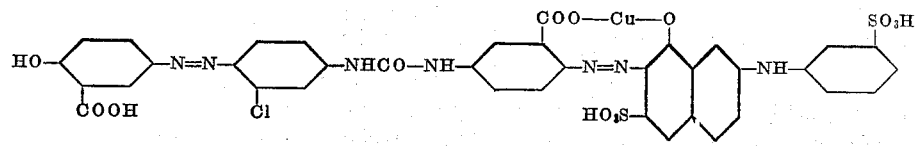

Example 2

To a fine suspension of 19 parts of cyanuric chloride in 400 parts of ice water is added a neutral solution of the sodium salt of 55.8 parts of the monoazo-dyestuff obtained by coupling diazotized 4-nitro-1-aminobenzene-2-carboxylic acid with 2-phenylamino-8-hydroxy-naphthalene-6:3'-disulfonic acid and then reducing the nitro group to an amino group. The whole is stirred at about 5° C. and the reaction mixture is neutralized by the dropwise addition of 50 parts of sodium carbonate solution of 10 per cent. strength. After one hour, there is added to the primary condensation product a neutral solution of the sodium salt of 26 parts of 4-amino-4'-hydroxy-1:1'-azo-benzene-3'-carboxylic acid, and the whole is stirred for 4 hours at 25–30° C. with the gradual addition of 40 parts of sodium carbonate solution of 10 per cent. strength. There are then added 20 parts of aniline and 15 parts of crystalline sodium acetate, and the whole is heated for two hours at 80° C. The reaction mixture is rendered alkaline with sodium carbonate, and the dyestuff is precipitated with sodium chloride and filtered off.

For the purpose of converting it into the copper complex the dystuff is dissolved in 2000 parts of warm water, and the solution is mixed with dilute sulphuric acid until the reaction becomes weakly acid to Congo. There are then added 25 parts of crystalline copper sulfate and the

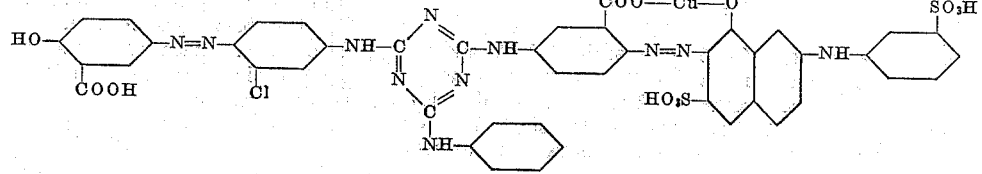

whole is heated for one hour at 80° C. The resulting copper complex is then filtered off and converted into its sodium salt by a method in itself known. After working up and drying the product, there is obtained a brown-black powder, which dissolves in water with a red-orange coloration and dyes cotton brown tints which are fast to light. The dyestuff corresponds to the formula

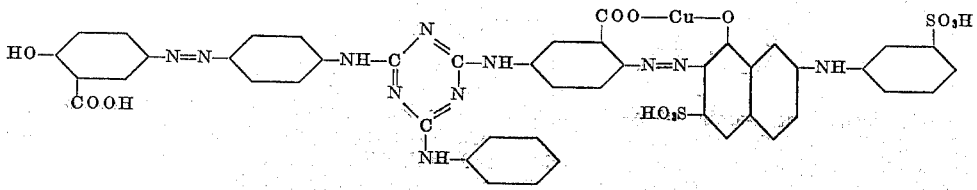

Example 3

29.2 parts of 2-chloro-4-amino-4'-hydroxy-1:1'-azobenzene-3'-carboxylic acid are dissolved in 1000 parts of water with the addition of the quantity of sodium carbonate necessary for neutralization. The solution is stirred with 15.6 parts of chloroformic acid phenyl ester until the odor of the ester disappears. Further sodium carbonate is added until the solution is only weakly acid (pH=6), and further chloroformic acid phenyl ester is introduced dropwise until the product is no longer capable of being diazotized. The urethane formed is filtered off with suction and introduced into a neutral solution of 55.8 parts of the dyestuff obtained by coupling diazotized 4-acetylamino-1-aminobenzene-2-carboxylic acid with 2-phenylamino - 8 - hydroxynaphthalene-6:3'-disulfonic acid and then splitting off the acetyl group. After the addition of 16.8 parts of sodium bicarbonate, the suspension is stirred at 50–60° C. until a test portion is no longer diazotizable and even after being heated with sodium carbonate solution for a short time is no longer diazotizable. The dyestuff is worked up in the usual manner. It dyes cellulose-containing fibers by the single bath or 2-bath after-coppering process level brown tints. The dyeings are distinguished by their good properties of fastness.

The dyestuff so obtained may advantageously without intermediate drying, be converted into its complex copper compound in a weakly acid solution in the usual manner, and the copper compound may be converted into its sodium salt. The copper-free and the cupriferous dyestuff are distinguished by their especially unitary character. The dyestuffs are identical with the main fraction of the corresponding dyestuffs obtainable as described in Example 1.

Example 4

The procedure is similar to that described in Example 2 except that the sequence of operations is changed by first condensing the cyanuric chloride with the amino-hydroxy-azobenzene carboxylic acid and then with the azo-dyestuff from 2-phenylamino-8-hydroxynaphthalene-6:3'-disulfonic acid, the remainder of the procedure being the same. The same dyestuff is obtained.

Dyestuffs having similar properties are obtained by replacing in the second amino-azo-dyestuff the 2-phenyl-amino-8-hydroxynaphthalene-6:3'-disulfonic acid by 2-phenylamino - 8 - hydroxynaphthalene-6-sulfonic acid-3'-carboxylic acid or by 2-phenylamino-8-hydroxy-naphthalene-6-sulfonic acid-4'-carboxylic acid.

By using 2-chloro-4-amino-4'-hydroxy-1:1'-azobenzene-3'-carboxylic acid as starting material, a similar dyestuff is likewise obtained. It corresponds to the formula

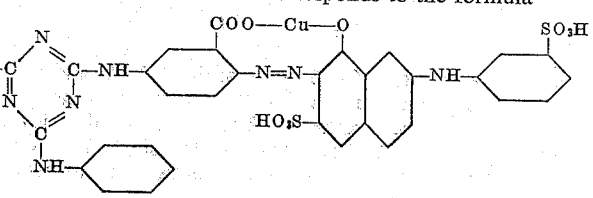

Example 5

28 parts of 4-amino-4'-hydroxy-1:1'-azobenzene-3'-carboxylic acid in the form of the sodium salt are dissolved in a mixture of 150 parts of acetone and 50 parts of water. The solution is added at 0° C. to a solution of 20 parts of cyanuric chloride in 140 parts of acetone. After 20 minutes, the product is filtered off and washed with benzene and water. In this manner there is obtained the compound of the formula

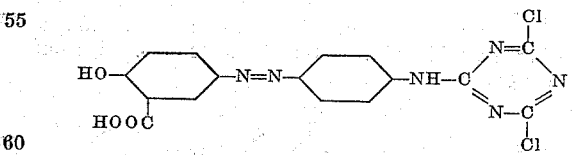

in an excellent state of purity. 41 parts of the latter product are stirred with 55 parts of the dyestuff of the formula

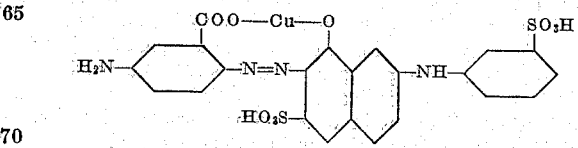

in aqueous acetone of 50 per cent. strength. The suspension is neuralized with triethylamine and stirred at 40° C., while maintaining the mixture neutral by the addition of further quantities of triethylamine, until no violet by-products can be detected in a paper chromatogram of a test portion. The dyestuff formed is then precipitated by the addition of further acetone, whereby any yellow by-products are retained in solution. The mixture is filtered, and the filter residue is washed with acetone. The residue is a loose dark brown powder, solutions of which dye cotton brown tints which are fast to light.

The dyestuff is identical with a dyestuff which is obtained as described in Example 2 with the omission of the heating of the intermediate product described in that example with aniline and sodium carbonate.

A similar dyestuff is obtained by starting from 2-chloro-4-amino-4'-hydroxy-1:1'-azobenzene-3'-carboxylic acid, instead of 4-amino-4'-hydroxy-1:1'-azobenzene-3'-carboxylic acid.

Example 6

18.4 parts of cyanuric chloride are condensed in aqueous solution in known manner with 26 parts of 4-amino-4'-hydroxy-1:1'-azobenzene-3'-carboxylic acid. The suspension of the primary condensation product is neutralized with dilute sodium carbonate solution, and there is added to the suspension a neutral solution of 48 parts of the amino-azo-dyestuff of the formula

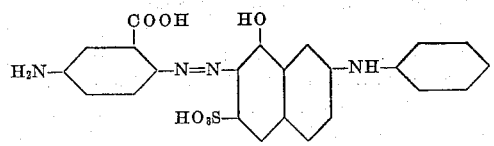

the mixture is stirred for 6 hours at 30–40° C., and the reaction mixture is neutralized with sodium carbonate solution of 10 per cent strength. The dyestuff is then isolated and dried. It dyes cotton by the single bath or 2-bath after-coppering process yellow-brown tints of very good fastness to light and washing.

When the third chlorine atom in the above dyestuff is reacted with aniline there is obtained a dyestuff having similar properties and corresponding to the formula

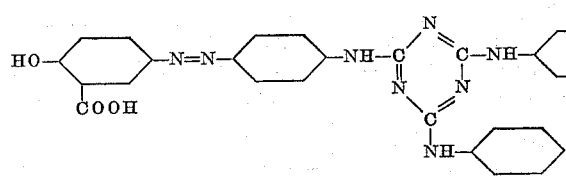

By using in this example, instead of 4-amino-4'-hydroxy-1:1'-azobenzene-3'-carboxylic acid, the corresponding quantity of 2-chloro-4-amino-4'-hydroxy-1:1'-azobenzene-3'-carboxylic acid, there is obtained a dyestuff which likewise dyes cotton yellow brown tints.

Example 7

Phosgene is introduced into an aqueous solution, which contains 20 parts of 4-amino-4'-hydroxy-1:1'-azobenzene-3'-carboxylic acid and 48 parts of the amino-azo-dyestuff of the formula

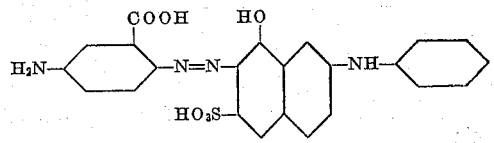

until the free amino group can no longer be detected. The mineral acid formed in the reaction is continuously neutralized by the addition of sodium carbonate. When the treatment with phosgene has finished, the resulting asymmetrical urea derivative is filtered off and dried. The dyestuff dissolves in water with a brown coloration and dyes cotton brown tints when after-coppered.

Example 8

38.7 parts of the amino-azo dyestuff of the formula

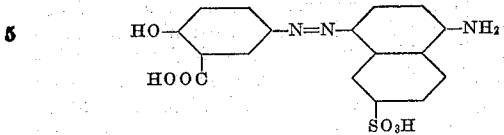

are dissolved in 800 parts of water with the addition of the quantity of sodium carbonate necessary for neutralization and condensed with 19 parts of cyanuric chloride with ice-cooling, whereupon the reaction product is neutralized with about 50 parts of a sodium carbonate solution of 10 per cent. strength. To the resulting sodium salt of the primary condensation product there is added a neutral solution of 55.8 parts of the monoazo-dyestuff of the formula

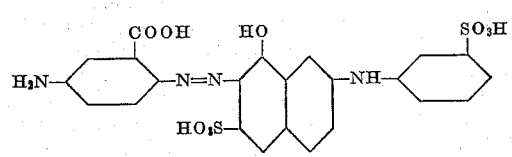

and the whole is stirred for several hours at 35° C. It is then heated with 20 parts of aniline for 3 hours at 90° C. The diazo dyestuff is filtered off and converted into its complex copper compound according to one of the methods described. The new dyestuff dyes cotton red brown tints.

Example 9

100 parts of cotton are entered at 40° C. into a dyebath, which contains in 3000 parts of water 1 part of the cupriferous dyestuff obtainable as described in the first and second paragraphs of Example 1. Dyeing is carried on for one hour while increasing the temperature to 90° C., 30 parts of crystalline sodium sulfate are added, and dyeing is continued for a further ½ hour at 90–95° C. The cotton is then rinsed and finished in the usual manner. It is dyed brown, and the dyeing is distinguished by a very good fastness to light.

What is claimed is:

1. An azo-dyestuff of the formula

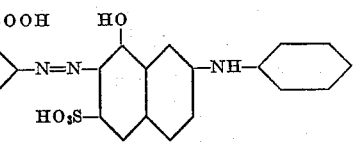

in which $R_1$, $R_2$ and Y each represent a benzene radical $R_1$ containing in para-position with respect to the azo linkage a hydroxyl group and in ortho-position to the latter group a carboxylic acid group, the azo-linkage and the —NH—CO—NH— group being bound to $R_2$ in para-position to each other, and Y containing a water solubilizing group.

2. The azo-dyestuff of the formula

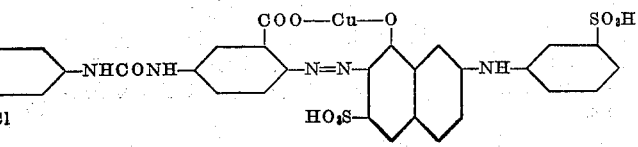

3. The azo-dyestuff of the formula
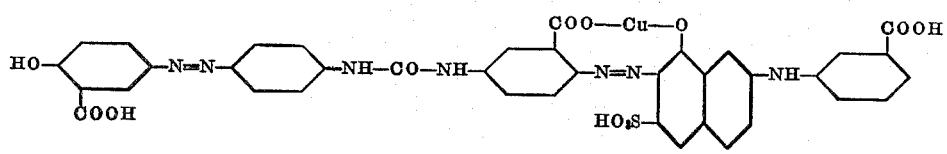
References Cited in the file of this patent
UNITED STATES PATENTS
| | | |
|---|---|---|
| 1,933,585 | Brightman et al. | Nov. 7, 1933 |
| 2,212,590 | Delfs et al. | Aug. 27, 1940 |
| 2,228,321 | Messmer et al. | Jan. 14, 1941 |
| 2,396,659 | Kaiser | Mar. 19, 1946 |
| 2,667,477 | Liechti | Jan. 26, 1954 |